Oct. 8, 1935. C. W. BLACKMUN ET AL 2,016,358
ELECTRIC AUTOMATIC FLUID HEATER
Filed Nov. 10, 1931

INVENTORS
Clyde W. Blackmun
Nicholas P. Samantas
Albert E. Lindstrom

UNITED STATES PATENT OFFICE 2,016,358

ELECTRIC AUTOMATIC FLUID HEATER

Clyde W. Blackmun, Nicholas P. Samantas, and Albert E. Lindstrom, San Francisco, Calif.

Application November 10, 1931, Serial No. 574,098

6 Claims. (Cl. 219—43)

This invention relates to improvements in electric automatic fluid heaters, and it consists of the combinations, constructions and arrangement of parts hereinafter described and claimed.

An object of our invention is to provide a heater which is automatic in operation, adjustable as to temperature, simple in construction and positive in action. Novel means are provided for accomplishing a quick break of the electric circuit and for keeping the electric contact points free from pitting and corrosion.

The heater is particularly adapted for use in beauty parlors and the like, wherein hair oil and other fluids are heated to a desired temperature before being applied. The heater that we provide eliminates the danger of overheating the fluids, which is apt to result in fires being started.

The heater may also be used for heating substances by utilizing the weight of the latter for causing the heating element to become active when the substance is placed on the heater.

Figure 1:
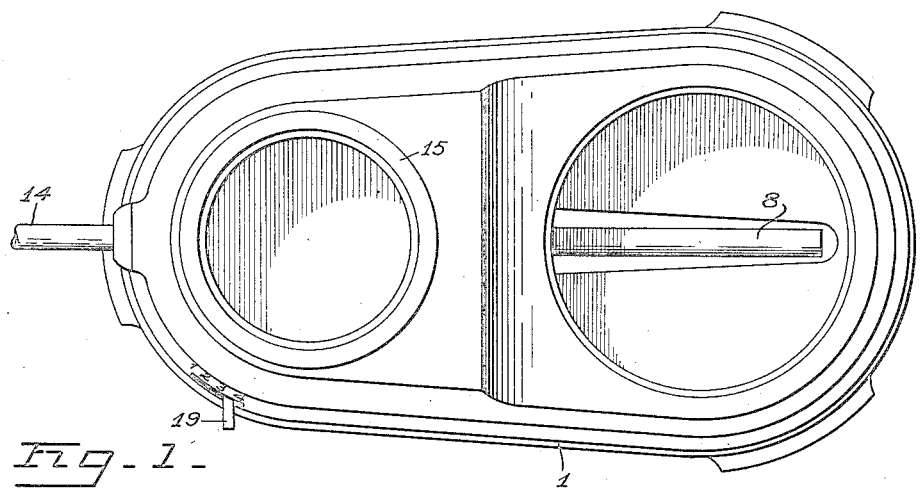
Figure 2:
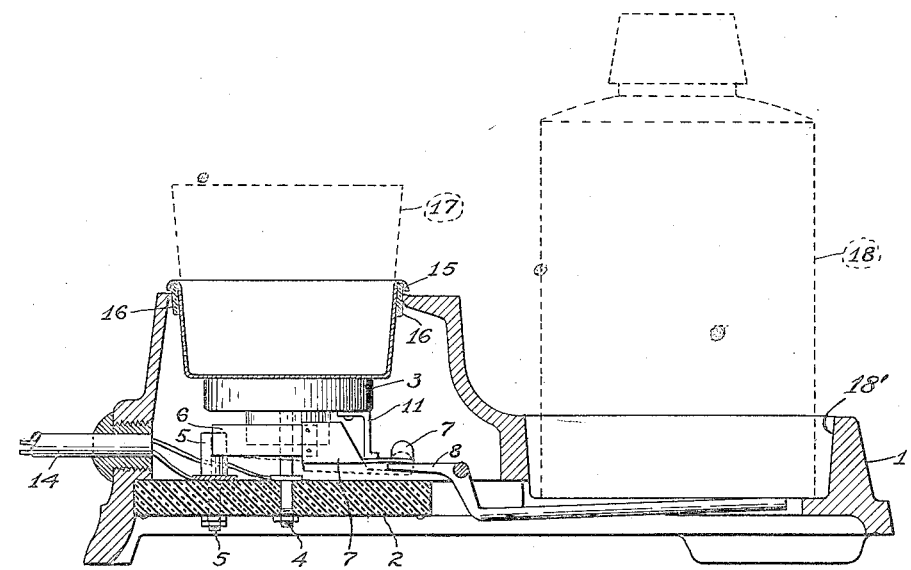
Figure 3:
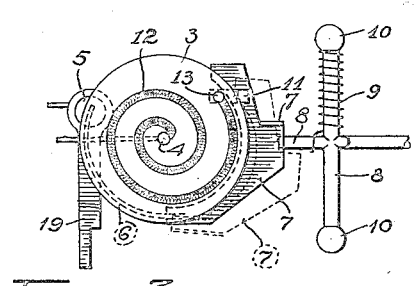

For a better understanding of our invention, reference should be had to the accompanying drawing, forming part of this application, in which:

Figure 1 is a plan view of the heater;

Figure 2 a longitudinal section through the heater assembly and the control mechanism therefor in heating position; and Figure 3 a plan view of the heater control illustrating the wiring connections.

While we have shown only the preferred form of our invention, it should be understood that various changes or modifications may be made within the scope of the appended claims without departing from the spirit of the invention.

In carrying out our invention, we provide a frame indicated generally at 1, and having an insulation block 2 mounted therein, the latter being provided with a heating unit 3 that is secured thereto by means of a screw 4. A thermostat support 5 is also mounted on the block, and this support carries a thermostat 6 having a spring contact arm 7 thereon fashioned with an upturned tab or abutment 7'. The normal tendency of the spring arm is to move downwardly toward the insulation block in the manner illustrated by the dotted lines in Figure 2.

It will be noted that the arm overlies and slides upon the end 8' of an operating lever 8, the latter being swingably attached to the block by means of bearings 10. The free end of the lever is normally depressed as will be hereinafter described, and when the end of the operating lever disposed beneath the contact arm 7 is raised, the latter is brought into circuit-closing relation with a contact arm 11 on the undersurface of the heater 3. In Figure 3 we show the arm 11 as being electrically connected to one end of a heating element 12 by a pin 13, while the opposite end of the heating element is attached to the support 4. It will be understood that the wires leading from the support 4 and the thermostat 5 through the covered tube 14 are connected to any suitable source of current (not shown).

The frame 1 is fashioned with an aperture therein adapted for receiving a cup 15 that may be held relative to the frame by asbestos tabs 16. The fluid to be heated is preferably placed in a sanitary receptacle 17, and this fluid is taken from a bottle 18. The frame 1 has a recess 18' formed adjacent to one end thereof in which the bottle 18 is normally placed, and the bottle in turn causes the operating lever 8 to move in a clockwise direction, thus establishing contact between the arms 7 and 11 during the warming of the heater.

As the thermostat 6 is flexed outwardly into the dotted line position shown in Figure 3 by heat being absorbed from heater 3, the arm 7 clears the end 8' of the operating lever, and the arm immediately drops toward the block under the influence of the spring tension so as to break the circuit from the contact arm 11. As the thermostat cools, the tab or abutment 7' strikes the end 8' of the lever 8 and prevents the arm 7 from returning to the full line position shown in Figure 3.

The oil or other fluid in the receptacle may be used as desired, and the supply replenished from time to time from the bottle 18, a new receptacle preferably being used. As the bottle is removed from the recess 18' prior to filling one of the receptacles, the free end of the lever 8 is moved upwardly by a coiled spring 9, the end 8' being moved against the block 2 during this operation. The spring arm 7 is thereupon freed from the abutment and the arm will then move into a position again overlying the end 8' of the operating lever. Upon replacing the bottle in the recess 18' the electric circuit will be again completed between the contacts 7 and 11.

The temperature at which the circuit is broken by the thermostat may be controlled by an adjusting lever 19, which controls the amount the thermostat must move before the arm 7 clears the end 8' of the operating lever. The relative degree of temperature is indicated by a graduated scale (see Figure 1).

The electric circuit is broken quickly as the arm 7 clears the lever 8, and this action prevents the contacts from becoming pitted due to arcing. It will also be noted that the sliding of the arm 7 across the contact 11 removes any pitting or corrosion that may occur.

If operated consecutively, the heater will not cause the oil to overheat or boil over, which, in the latter case, might cause a fire to start. The heater must cool sufficiently between operations to permit the thermostat to return to a position where the end 8' of the operating lever will be under the spring contact arm 7.

The weight of the fluid in the cup 15 may also be used for causing the mechanism to operate substantially as shown. In this case, the lever 8 would have its free end supporting the cup 15 so as to depress the lever and actuate the mechanism in the same manner as described.

We claim:

1. A fluid heater comprising a frame, a cup therein for fluid, a heating element for warming the fluid, an electrical circuit for the heating element having a switch therein, the switch having a wiping contact, a thermostat connected to the wiping contact, a lever for flexing the wiping contact into circuit-closing relation, the thermostat being actuated by heat from the heating element for opening the switch by sliding the wiping contact off of the lever so as to allow the wiping contact to yield, and a stop on the wiping contact for preventing the thermostat from returning to normal until the lever is released.

2. A fluid heater comprising a frame, a cup therein for fluid, a heating element for warming the fluid, an electrical circuit for the heating element having a switch therein, the switch having a wiping contact, a thermostat connected to the latter, said frame having a recess for receiving a receptacle, a lever actuated upon inserting or removing a receptacle into or out of the recess, the lever being arranged for flexing the wiping contact into circuit-closing position upon the insertion of the receptacle, the thermostat being responsive to the heating element for sliding the wiping contact off of the lever and to allow the contact to yield and open the switch, and a stop on the wiping contact for preventing the thermostat from returning to normal until the receptacle is removed from the frame.

3. A heater comprising a heating element, an electrical circuit therefor including a switch normally urged into open position, a thermostat responsive to the heating element for sliding the contacts of the switch relative to each other, and means for holding the contacts together during the sliding thereof and made to release the contacts and break the circuit after a predetermined amount of flexing of the thermostat.

4. A heater comprising a heating element, an electrical circuit therefor including a switch normally urged into open position, a thermostat responsive to the heating element for sliding the contacts of the switch relative to each other, means for holding the contacts together during the sliding thereof and made to release the contacts and break the circuit after a predetermined amount of flexing of the thermostat, and means for securing the thermostat against return movement after the switch has been opened until manually released.

5. A heater comprising a frame having a recess, a heating element provided with an electrical circuit, a switch included in the circuit, a thermostat responsive to the heating element for opening the switch, and means projecting into the recess and being movable when a receptacle is placed in the recess for moving and holding the switch in closed position during a predetermined amount of flexing of the thermostat, the switch thereafter being opened.

6. A heater comprising a frame having a recess, a heating element provided with an electrical circuit, a switch included in the circuit, a thermostat responsive to the heating element for opening the switch, means projecting into the recess and being movable when a receptacle is placed in the recess for moving and holding the switch in closed position during a predetermined amount of flexing of the thermostat, the switch thereafter being opened, and means cooperating with said means for holding the switch against closing again until the receptacle is removed from the recess.

CLYDE W. BLACKMUN.
NICHOLAS P. SAMANTAS.
ALBERT E. LINDSTROM.